United States Patent [19]

Tubaro

[11] 4,418,887
[45] Dec. 6, 1983

[54] PLUG VALVE

[76] Inventor: Bruno Tubaro, 76/2, Via Solimano, Sori(Genova), Italy

[21] Appl. No.: 315,023

[22] Filed: Oct. 26, 1981

[30] Foreign Application Priority Data

Oct. 31, 1980 [IT] Italy .................. 15244 B/80[U]

[51] Int. Cl.³ .......................................... F16K 51/00
[52] U.S. Cl. .................................. 251/152; 251/315
[58] Field of Search ............... 251/315, 308, 192, 214, 251/152, 170, 171

[56] References Cited

U.S. PATENT DOCUMENTS

| | | | |
|---|---|---|---|
| 2,360,733 | 10/1944 | Smith | 215/214 X |
| 2,995,336 | 8/1961 | Usab | 251/163 |
| 3,033,227 | 5/1962 | Goldman | 251/192 X |
| 3,314,644 | 4/1967 | Dwyer et al. | 251/309 |
| 3,438,387 | 4/1969 | Scaramucci | 137/315 |
| 3,586,289 | 6/1971 | Priese | 251/214 |
| 3,765,440 | 10/1973 | Grove et al. | 251/315 X |
| 4,059,250 | 11/1977 | Guldener et al. | 252/315 X |
| 4,103,865 | 8/1978 | Nanba et al. | 251/315 X |
| 4,327,895 | 5/1982 | Blumenkranz et al. | 252/315 |

FOREIGN PATENT DOCUMENTS 2238269 12/1971 Fed. Rep. of Germany .
953949 4/1964 United Kingdom .............. 251/315

Primary Examiner—Martin P. Schwadron
Assistant Examiner—Sheri Novack
Attorney, Agent, or Firm—Brady, O'Boyle & Gates

[57] ABSTRACT

The plug valve comprises a valve body presenting a cylindrical extension provided with inner angularly equispaced longitudinal cogs. Into the cylindrical extension there is inserted a connector sleeve provided on its outer surface with angularly equispaced longitudinal cogs, so that the connector member can be shifted axially but cannot rotate at the interior of the cylindrical extension. The connector sleeve thus inserted is axially blocked by means of a ring nut which is screwed onto an external threading of the cylindrical extension. The connector sleeve carries at its inner end an annular packing which is caused to adhere in a tight manner against the spherical plug of the valve, while another similar annular packing is housed in the valve body, on the opposite side of the spherical plug. The spherical plug is rotated into its open or closed condition by means of a control stem passing through a transverse bore obtained in the valve body and coupled to the spherical plug by means of a groove and rib coupling.

3 Claims, 9 Drawing Figures

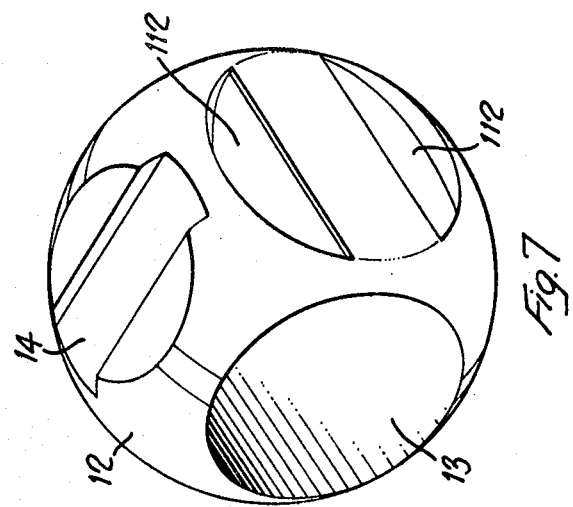
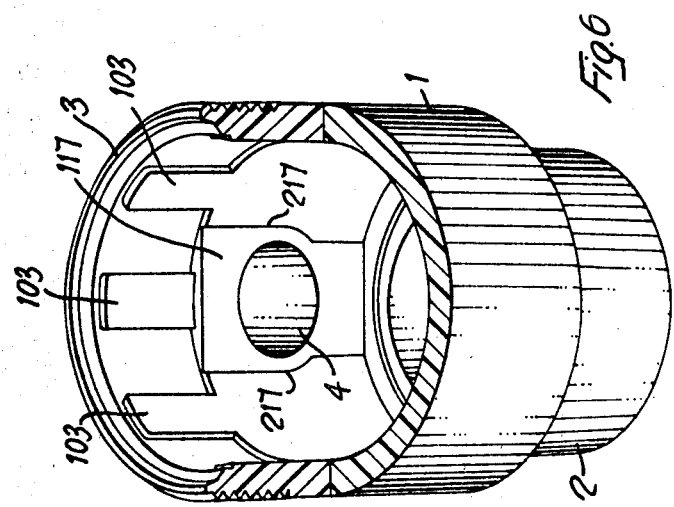

PLUG VALVE

SUMMARY OF THE INVENTION

The present invention has for its object a valve made of plastic, of the type having a spherical plug, particularly adapted for water ducts, irrigations plants or the like. Of course the valve can be used for any other suitable purposes.

The invention provides a valve of the above mentioned type composed exclusively of molded pieces, with the elimination or reduction to the minimum of operations subsequent to the molding; moreover it provides a valve of easy and quick assembly and of remarkable tight seal features although incorporating a limited number of packings, the whole in such a manner as to provide a valve which can be economically produced at relatively low costs, while it affords very satisfactory performances.

In the plug valve according to the invention, the valve body presents, on at least one side, a cylindrical extension provided with a plurality of angularly equispaced longitudinal cogs, and into the said cylindrical extension there can be inserted a connector sleeve presenting on its outer surface a plurality of angularly equispaced longitudinal cogs adapted to be fitted between the inner cogs of the cylindrical extension. The connector sleeve thus inserted is axially blocked by means of a ring nut which is screwed onto an external threading of the cylindrical extension. The connector sleeve carries at its inner end an annular packing which is caused to tightly engage against the spherical plug of the valve. The non-rotational coupling between the cylindrical extension of the valve body and the connector sleeve, obtained by means of the mentioned cogs, avoids any rotation of said connector sleeve whenever an outer pipe or similar duct is screwed into the same. This arrangement permits said pipe to screw into the connector sleeve without the need of tightening the ring nut in an excessive manner in order to avoid the rotation of the connector sleeve, which tightening would be necessary if the cogs were not present. In this manner, damage to the annular packings engaging the spherical plug is avoided.

The above and other characteristic features of the invention, and the advantages deriving therefrom, will appear evident from the following detailed description of a preferred embodiment thereof, illustrated, by way of non-limiting example, on the attached drawings.

BRIEF DESCRIPTION OF THE DRAWINGS

In the drawings:

FIG. 6 shows in perspective view the valve body, viewed from the arrow IV of FIG. 1 and with a part broken away.

FIG. 7 shows in perspective view the spherical plug of the valve.

DESCRIPTION OF THE PREFERRED EMBODIMENT

Figure 1:
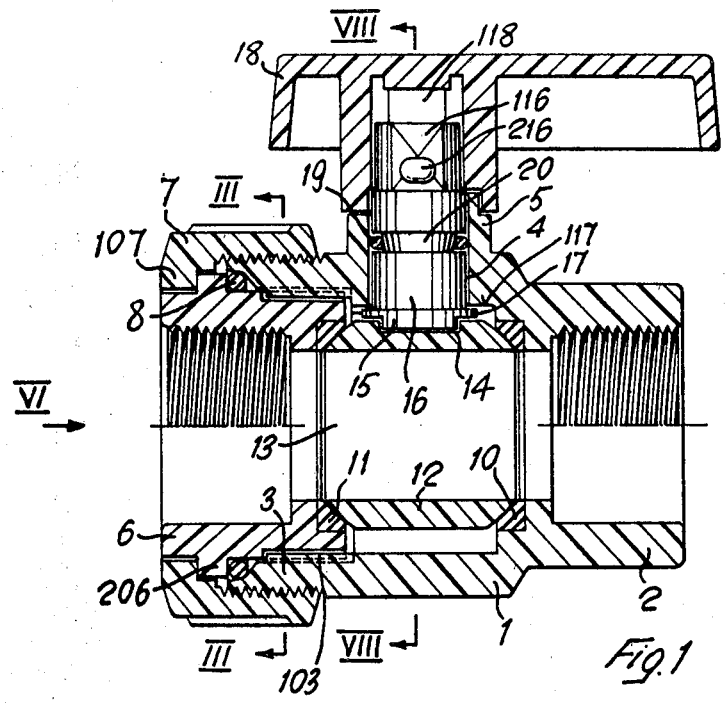
FIG. 1 shows a plug valve according to the invention, in longitudinal section and in opened position.

In the Figures, reference numeral 1 indicates the valve body which, in the illustrated embodiment, presents on one side (either the inlet or the outlet side) a pipe union 2 and on the opposite side a cylindrical extension 3 externally threaded and coaxial with the said pipe union 2. The said extension 3 is provided at its interior with cogs 103 which are angularly equispaced and extend in the same axial direction as the said extension 3. Between the pipe union 2 and the threaded cylindrical extension 3, the valve body 1 has a transverse cylindrical bore 4 with its axis perpendicular to the common axis of the pipe union 2 and of the extension 3. The said transverse bore 4 (which is intended to house the control stem of the valve plug, as it will be seen hereinafter following) opens into the interior of the valve body 1, while around its outer opening there projects, from the valve body 1, a tubular collar 5. The above described valve body 1 is made of one single piece of plastic, preferably by injection moulding.

Figure 3:
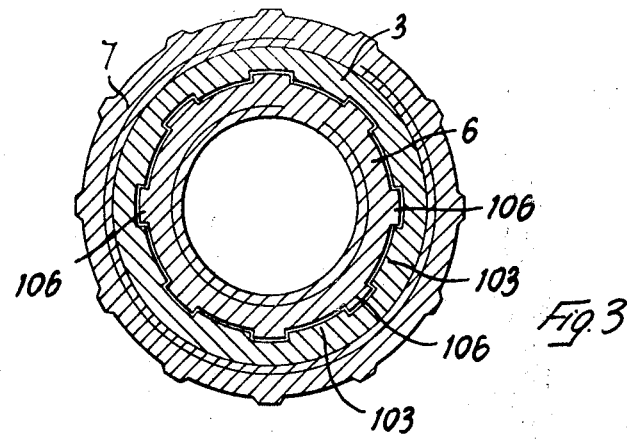
FIG. 3 is a transverse section along line III—III of FIGS. 1 and 2.

At the interior of the cylindrical extension 3, which is externally threaded and internally toothed, there is axially inserted from the exterior a connector sleeve 6, the inner end of which is provided externally with cogs 106 angularly equispaced and extending in the axial direction of the said connector sleeve 6 itself. The said external cogs 106 of the connector sleeve 6 come to be inserted between the inner cogs 103 of the extension 3 of the valve body 1, thus determining a non-rotatable coupling between the connector sleeve 6 and the valve body 1 such that the said connector sleeve 6 cannot rotate at the interior of the cylindrical extension 3 as illustrated more particularly in FIG. 3. The connector sleeve 6 is secured in the extension 3 of the valve body 1 by means of a threaded ring nut 7 which is screwed onto the external threading of the said extension 3 and is superimposed, by its inner rim 107, onto an outer annular projection 206 of the said connector sleeve 6. When the valve is in mounted condition, the annular head-end surfaces of the connector sleeve 6 and of the ring nut 7 are substantially co-planar.

Figure 4:
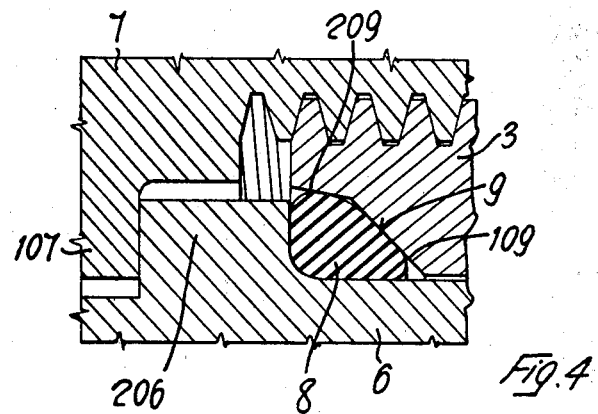
FIGS. 4 and 5 show in section and in an enlarged scale two details relating to the packings used in the valve according to the invention.

The tight seal between the valve body 1 and the connector sleeve 6 is ensured by a single annular packing 8, for example of the O-ring type, which is housed in a flaring enlargement 9 which is of a conical or a double-conical section, and which is positioned at the outer free end of the cylindrical extension 3 of the valve body 1, as illustrated more particularly in FIG. 4. The annular packing is compressed within said flaring enlargement 9 by the annular projection 206 of the connector sleeve 6. More particularly, the flaring enlargement 9 has an inner conical portion 109 and an adjoining outer conical portion 209. The vertex angle of the cone corresponding to the inner conical portion 109 is greater than the vertex angle of the cone corresponding to the outer conical portion 209. The angle between the external surface of the connector sleeve 6 and the said annular projection 206 is rounded.

By this arrangement of the tight seal between the valve body 1 and the connector sleeve 6, the manufacture of the valve is rendered more simple and economical, and moreover there are avoided any undercut portions thus simplifying the construction of the molds.

Figure 2:
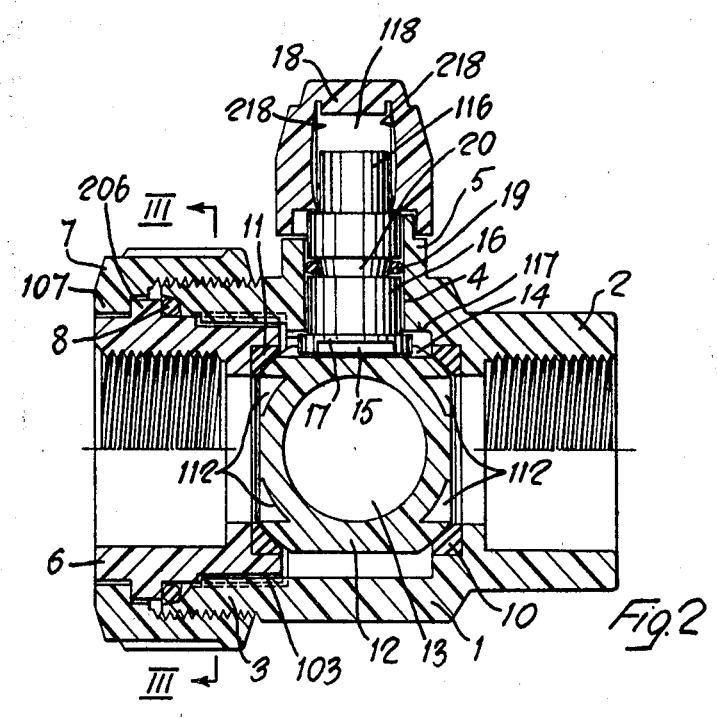
FIG. 2 shows the valve according to FIG. 1, in longitudinal section and in closed position.

The connector sleeve 6 and/or the pipe union 2 can be internally threaded so as to permit the screwing therein of a pipe or any other tubular element. On the other hand, as shown in FIGS. 1 and 2 for the lower halves of the connector sleeve 6 and of the pipe union 2, the said two parts can present a smooth inner surface defining a bore into which the pipe or other tubular element can be simply fitted and more particularly glued.

The valve seat consists of a pair of annular packings 10, 11 which in cross section are substantially triangular in shape and are housed in corresponding recesses provided, for the first packing 10, in the valve body 1 around the inner outlet of the pipe union 2, and for the second packing 11 in the inner free end of the connector sleeve 6. Between the said two annular packings 10, 11 which are preferably made of polytetrafluoroethylene resin (PTFE, commercially known under the trade mark "Teflon") or the like material, there is housed the spherical plug 12 of the valve, which plug 12 is rotatable around the axis of the transverse bore 4 of the valve body 1 and the said packings 10, 11 are compressed against it to provide a tight seal by means of the ring nut 7 and of the connector sleeve 6.

Figure 9:
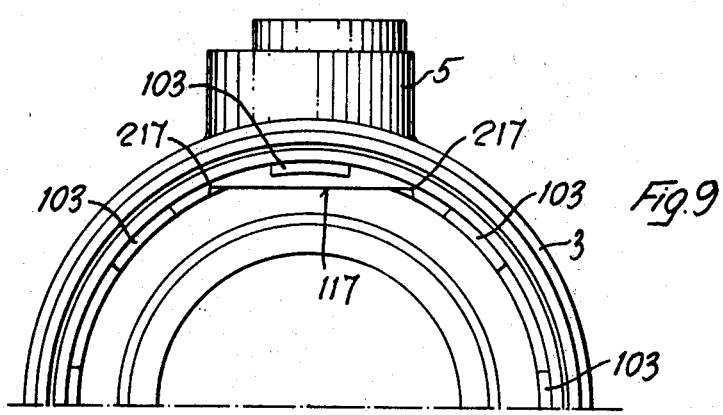
FIG. 9 shows the valve body in partial elevation, viewed from arrow VI of FIG. 1.

The spherical plug 12 has a through bore 13 and it is provided, on its side facing the transverse bore 4, with an outer groove 14 arranged transversally with respect to the axis of the through bore 13 and which is engaged by a corresponding rib 15 provided at the inner end of the control stem 16 which is rotatably housed inside said bore 4. At its inner end, the stem 16 is provided with an annular flange 17 which prevents the stem itself from sliding out of the transverse bore 4. The said annular flange 17 provided on the stem 16 cooperates with a flat abutment and sliding surface 117 provided at the interior of the valve body 1 surrounding the transverse bore 4. The said flat surface 117 is obtained by the forming (molding) of the valve body 1, thus avoiding the need of any subsequent flattening of the interior of the valve body. In order to allow the molded valve body 1 to be easily stripped from the respective mold, without the need of increasing for this purpose the inner diameter of the said valve body 1, each one of the longitudinal edges 217 of the inner flat surface 117 of the valve body 1 is located to be in registration with the hollow space between two inner cogs 103 of the cylindrical extension 3, and the said inner flat surface 117 of the valve body 1 intersects the inner cylindrical surface of the extension 3 in correspondence with the said hollow spaces between the cogs 103. In this manner, the radial thickness of the inner cogs 103 of the cylindrical extension 3 are contained within the radial thickness of the projecting portion formed at the interior of the valve body 1 by the said flat surface 117, as it results evident particularly from FIGS. 6 and 9. The control stem 16 projects outwardly from the valve body 1 through the tubular collar 5 and terminates with a non-round portion 116 onto which non-round portion there can be fitted, by means of a corresponding non-round bore of its hub 118, a handle 18 for operating the valve. This handle 18 therefore is coupled to rotate the control stem 16 which in turn is coupled to rotate the plug 12 by means of the rib 15 and of the groove 14. By acting on the handle 18, the plug 12 can be rotated at will in either direction so as to be brought to its open position, in which its through bore 13 come to be coaxial with the two annular seats 10 and 11 of the valve and consequently with the connector sleeve 6 and with the pipe union 2, as shown in FIG. 1, or it can be brought to its closed position, rotated of 90° with respect to the open position, as shown in FIG. 2. The angular positions of the handle 18 corresponding to the angular open and closed positions of the plug 12 can be determined by suitable cooperating abutment members, provided on the rim of the collar 5 and on the hub of the handle 18.

Figure 8:
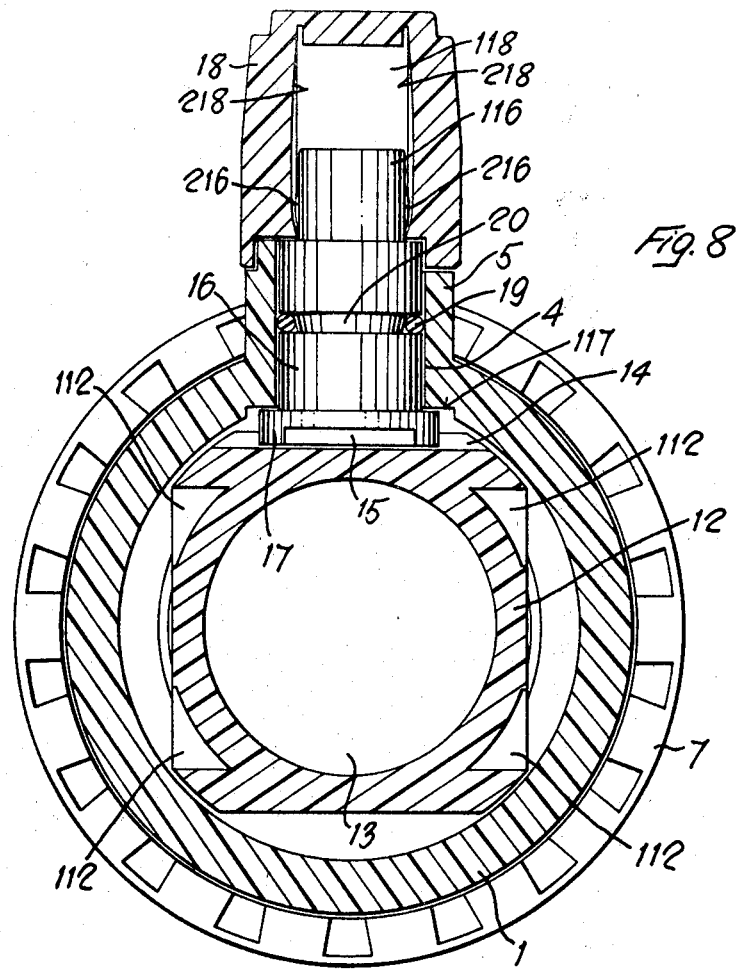
FIG. 8 is a section in an enlarged scale according to line VIII—VIII of FIG. 1.

In order to secure the handle 18 in a non-movable manner onto the control stem 16, the fact is taken advantage of that the inner walls 218 of the bore 118 of the handle 18 assume, due to shrinkage of the plastics material after the handle is removed from the mold, a concave shape as illustrated particularly in FIG. 8. Consequently, according to the invention, on the flattened surfaces of the non-round portion 116 of the stem 16 there are provided slightly protruding rounded projections 216 which enter into snap engagement with the concave walls 218 of the bore 118 of the handle 18.

Figure 5:
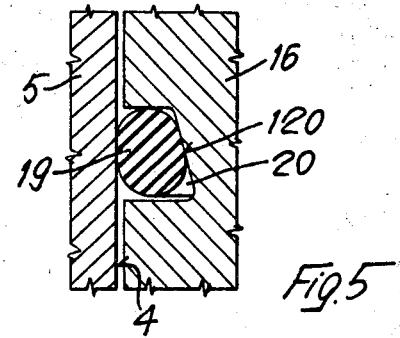

The tight seal between the control stem 16 and the valve body 1 is ensured by an annular packing 19, of the O-ring type, housed in a peripheral annular groove 20 of the control stem 16. As seen more particularly from FIG. 5, the bottom 120 of said annular groove 20, facing the inner wall of the bore 4, is conical radially inclined outwardly towards the outer end of the control stem 16, so that the depth of the said annular groove 20 increases in the axial direction of the stem 16 from the exterior towards the interior.

All the component parts, such as the connector sleeve 6, the ring nut 7, the plug 12, the control stem 16 and the handle 18 are made of suitable plastic which can be the same as the one used for the valve body 1.

The spherical plug 12 presents externally, on its two opposite sides, the recessed portions 112 which have a shape and profile such as to render the thickness of the wall of the plug 12 substantially uniform throughout the whole surface of the plug 12 itself. In this manner it is uniformed and deformation of the plug due to plastic shrinkage is reduced and consequently the perfect sphericity of the outer surface of the plug 12 is guaranteed in correspondence with the annular packings 10 and 11. Thus, there is ensured the perfect tight seal of the valve plug 12 against the said annular packings 10 and 11.

The assembly of the valve takes place as follows:

Through the cylindrical extension 3 of the valve body 1 there is introduced firstly the control stem 16 which is inserted from the interior into the transverse bore 4, until it abuts with its flange 17 against the flat surface 117 of the valve body surrounding the said bore 4. Upon the insertion of the control stem 16 into the transverse bore 4, the packing 19 housed in the annular peripheral grove 20 of the said stem 16 and which slightly projects beyond said groove, meets the edge of the inner outlet of the bore 4 and it is shifted towards the deeper portion of the groove 20 itself. Consequently, the said packing 19 can easily pass over the edge of the inner outlet of the transverse bore 4. This structure avoids the necessity of any particular machining of the inner edge of the bore 4, and permits the stem 6, carrying the annular packing 19, to be inserted into the bore 4 without damaging the said annular packing 19.

Subsequently, into the valve body 1 there is introduced the spherical plug 12, by causing its outer groove 14 to slide over the rib 15 of the control stem 16. Inside the cylindrical extension 3 of the valve body 1 there is then inserted the connector sleeve 6 which is locked to the valve body 1 by means of the ring nut 7 screwed onto the external threading of the said cylindrical extension 3. The non-rotational coupling between the cylindrical extension 3 of the valve body 1 and the connector sleeve 6, obtained by means of the cogs 103, 106, avoids any rotation of said connector sleeve whenever an outer pipe or similar duct is screwed into the sleeve 6. This arrangement permits a pipe to be screwed into the connector sleeve 6 without the need of tightening the ring nut 7 in an excessive manner in order to avoid the rotation of the connector sleeve 6, which tightening would be necessary if the cogs 103, 106 were not present. In this manner, damage to the annular packings 10 and 11 is avoided.

As a modification, instead of the pipe union 2, being one single piece with the valve body 1, there can be provided another cylindrical extension 3, externally threaded and provided with inner cogs, inside which there is inserted a connector sleeve 6 provided with outer cogs and fitted with a tight seal by means of a packing 8 and of a ring nut 7, in a similar manner to that above described for the other side of the valve. In this case, both annular packings 10 and 11 are carried each by a connector sleeve 6 and the valve body presents a symmetric construction. Also in this case, the bores of the two connector sleeves can be smooth or threaded.

It is to be noted moreover that between each connector sleeve 6 and the respective ring nut 7 there is provided, on their outer ends, a small radial clearance so that the ring nut 7 can be easily fitted onto the sleeve 6 and screwed onto the cylindrical extension 3 of the valve body 1. When the sleeve 6 is subjected to radial expansion, for example due to the screwing in at its interior of a metallic pipe having a conical end, or the like, the sleeve 6 expands radially and elastically in such a manner as to abut, without breaking, with its external surface against the ring nut 7. In this manner, the ring nut 7 constitutes an outer reinforcement band for the sleeve 6, whenever this latter is subjected to great radial expansion stresses, thus avoiding the breakage of the said sleeve 6 and conferring to same a strength which is corresponding to the sum of the thicknesses of the walls of the sleeve 6 and of the ring nut 7.

The rotational coupling between the spherical plug 12 and the control stem 16 can be obtained also by providing the groove 14 on the inner end of the stem 16 and the corresponding rib 15 on the plug 12. In any case, the rib 15 and the groove 14 for the coupling between the control stem 16 and the spherical plug 12 are preferably directed transversely with respect to the axis of the through bore 13 of the plug 12 so that, in the closed position of the valve, they come to be arranged parallel to the longitudinal axis of the valve, that is parallel to the axis passing through the ideal centres of the two annular packing 10, 11 and in this manner they permit to the plug 12 to perform the movements which are necessary in order to ensure the tight seal with the said packings 10, 11.

The valve according to the invention can be of course constructed of metal, partially or totally.

It is believed that the invention will have been clearly understood from the foregoing detailed description of a preferred embodiment. Changes in the details of construction may be resorted to without departing from the spirit of the invention, and it is accordingly intended that no limitation be implied and that the hereto annexed claims be given the broadest interpretation to which the employed language fairly admits.

What is claimed is:

1. A plug valve made of plastics material, particularly adapted for water ducts, irrigation systems and the like, comprising:

a valve body (1) having two tubular coaxial extensions (2, 3);

a spherical plug (12) housed in said valve body (1) between said two tubular extensions (2, 3) and having a diametral through bore (13) and a groove (14) on the periphery thereof extending transversely to said dimetral through bore (13), said spherical plug (12) being rotatable in said valve body around an axis which is perpendicular to the common axis of said two coaxial tubular extensions (2, 3);

said valve body having a transverse bore (4) through one side thereof with an inner outlet between said two tubular extensions (2, 3), the transverse bore having an axis that is coaxial with said perpendicular axis of said spherical plug (12);

a control stem (16) rotatably mounted in said transverse bore (4), seal means (19, 20) connected between said control stem and said transverse bore (4), a radial rib (15) projecting from the inner end of said control stem (16) and engaged in said groove (14) on the periphery of said spherical plug to operatively couple said control stem (16) to said spherical plug (12), a flat abutment and sliding surface (117) formed in the valve body (1) surrounding the inner outlet of the transverse bore (4), an annular flange (17) integral with the said inner end of said control stem (16) positioned adjacent to and cooperating with said flat abutment and sliding surface (117);

at least one connector sleeve (6) axially slidably inserted into the interior of one of the said two tubular extensions (2,3) of the valve body (1), a coaxial annular packing (11) on the inner end of said connector sleeve (6) adapted to be compressed in a tight manner against said spherical plug (12);

an annular peripheral exterior projection (206) on said connector sleeve (6), a conical flaring enlargement (9) on the mouth of said one of the said two tubular extensions (3) of the valve body, an annular packing (8) adapted to be compressed into said conical flaring enlargement (9) by said annular projection (206);

a plurality of longitudinal cogs (103) on the inner wall of said one of said two tubular extensions (3), plural external longitudinal mating cogs (106) on said connector sleeve (6) adapted to engage with said plurality of longitudinal cogs (103) on said one of said two tubular extensions (3);

a locking ring nut (7), external threading on the said one of said two tubular extensions (3) onto which said locking ring nut (7) is screwed, said locking ring nut (7) being superimposed over said connector sleeve (6) so as to cover and surround the said peripheral exterior annular projection (206) on said connector sleeve (6), said locking ring nut (7) having an inner projection portion (107), said locking ring nut (7) adapted to be screwed onto said one of said two tubular extensions (3) to such an extent that the inner projection portion (107) axially moves into substantially flush contact with said annular projection (206) of said connector sleeve (6) causing said annular projection (206) to compress said annular packing (8), a small annular radial clearance being provided between the said connector sleeve (6) and the said ring nut (7) whereby said ring nut can be easily superimposingly fitted onto said connector sleeve (6) and screwed onto the said external threading on said tubular extension (3) of the valve body (1), whereby when said connector sleeve (6) is subjected to radial expansion it abuts against said ring nut.

2. A plug valve according to claim 1, in which the said conical flaring enlargement (9) on the said one of the said two tubular extensions (3) of the valve body (1) comprises an inner conical portion (109) and an adjacent outer conical portion (209), and the vertex angle of the cone corresponding to said inner conical portion (109) being greater than the vertex angle of the cone corresponding to said outer conical portion (209).

3. A plug valve according to claim 1, in which said flat abutment and sliding surface (117) surrounding the inner outlet of the transverse bore (4) housing said control stem (16), intersects the inner wall of said one of said two tubular extensions (3) of said valve body (1) thus defining two longitudinal intersection edges (217) extending in the axial direction of said valve body (1), and said intersection edges (217) are each located in alignment with the hollow space between a pair of said longitudinal cogs (103) on the inner wall of the said one of said two tubular extensions (3).

* * * * *